July 22, 1924.

E. E. McCOLLUM

SPEED REDUCING DEVICE

Filed Sept. 28, 1922

1,502,107

2 Sheets-Sheet 1

July 22, 1924.

E. E. McCOLLUM 1,502,107

SPEED REDUCING DEVICE

Filed Sept. 28, 1922

2 Sheets-Sheet 2

Witness:
Geo. C. Davison

Inventor
Earl E. McCollum
By Munday & Wilson
Attys

Patented July 22, 1924.

1,502,107

UNITED STATES PATENT OFFICE.

EARL E. McCOLLUM, OF DOWNERS GROVE, ILLINOIS.

SPEED-REDUCING DEVICE.

Application filed September 28, 1922. Serial No. 591,041.

*To all whom it may concern:*

Be it known that I, EARL E. McCOLLUM, a citizen of the United States, and resident of Downers Grove, in the county of Du Page and State of Illinois, have invented certain new and useful Improvements in a Speed-Reducing Device, of which the following is a specification.

My invention relates to speed reducing mechanisms and particularly to a device adapted for use as a hoist or for general speed reducing purposes. The construction herein disclosed is an improvement on the device of my copending application, Ser. No. 556,208 filed April 24, 1922.

One of the principal objects of this invention is to provide speed reducing mechanism adapted for a high ratio of reduction. In the device herein disclosed this result is accomplished with relatively high efficiency and without complication of parts. The results are secured by the employment of the principle disclosed in prior patents and applications in which gear rings of the same pitch diameter but having a different number of teeth, are utilized.

Figure 1:
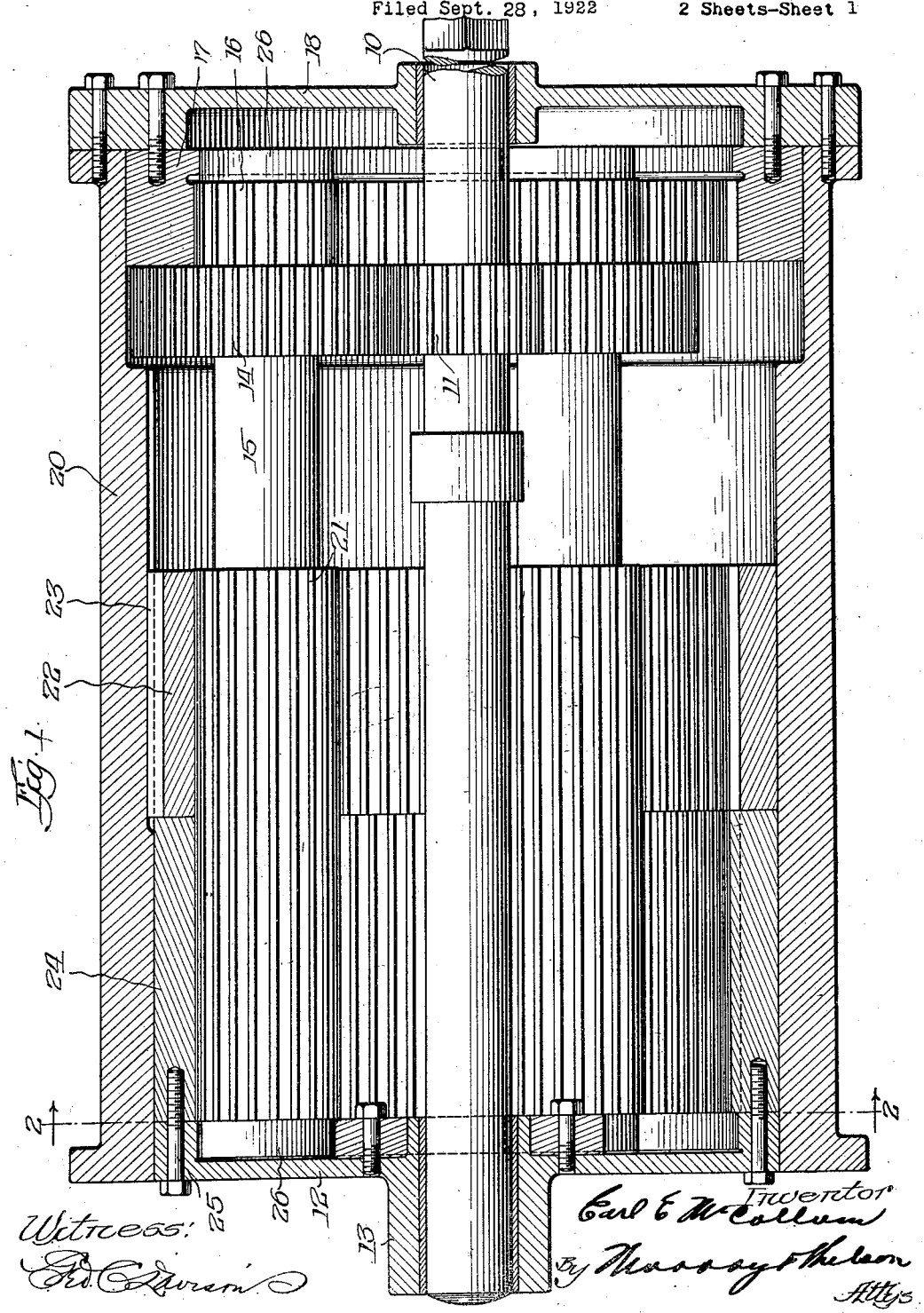
Figure 2:
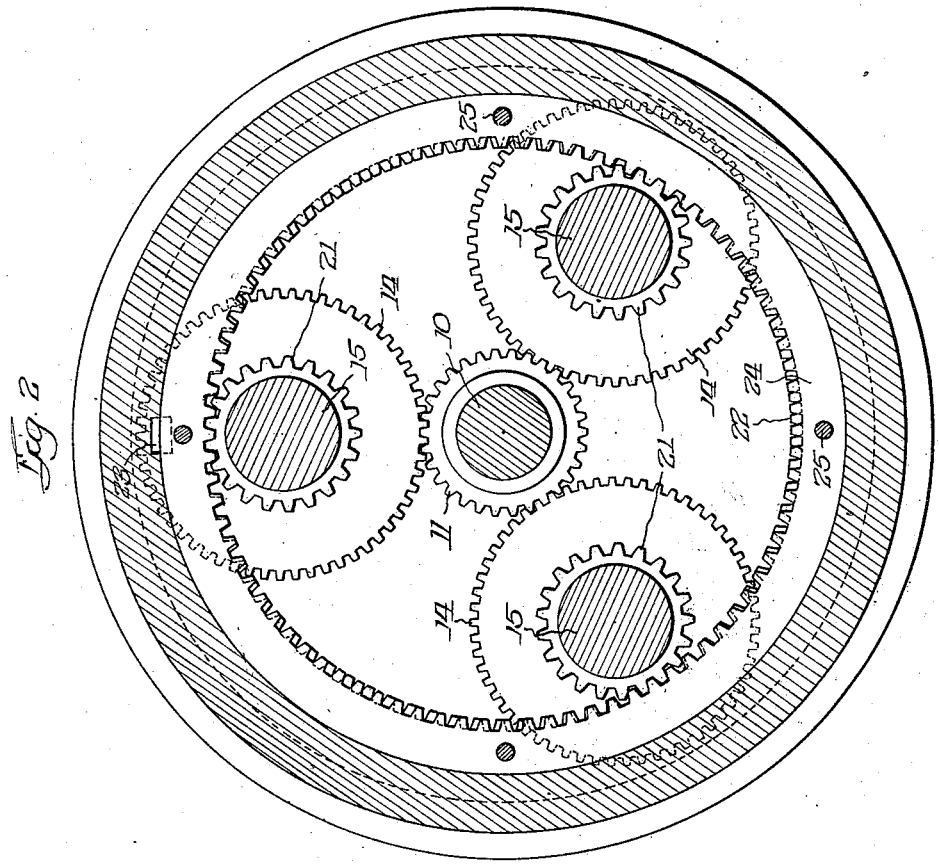

The invention will be more readily understood by reference to the accompanying drawings in which:

Figure 1 is a vertical sectional view through a device constructed in accordance with my invention; and Figure 2 is a transverse sectional view thereof.

In the drawings it will be seen that I provide a drive shaft 10 carrying a pinion 11 having thirty teeth. A bearing is provided for the opposite end of the shaft in a head 12 having a hub 13 which may be suitably clamped to prevent rotation thereof.

The pinion 11 engages with gears 14 having fifty-seven teeth and fixed to a shaft 15. As shown in Figure 2 I provide three of said shafts in equally spaced relation around the drive shaft. Also fixed to the shafts 15, adjacent to the gears 14, are pinions 16 which may also have thirty teeth. The pinions 16 engage an internal gear ring 17, having eighty-one teeth, fixed to the head 18 by means of bolts 19. Also secured to the head 18 is a drum 20 on which a rope may be wound, the drum extending from end to end of the device and providing for a relatively large hoist capacity.

Also secured to the shafts 15 are long pinions 21 which engage with a second internal gear ring 22, having eighty-one teeth, secured to the drum 20 by means of a key 23. All the gears and pinions heretofore described are provided with teeth of standard contour. However the long pinions 21 also engage with an internal gear ring 24 which is fixed to the stationary head 12 by means of bolts 25 and is provided with eighty-four teeth but has the same pitch diameter as the rings 17, 22. This necessitates that the teeth be specially cut and preferably the contour thereof is that which will result from a method such as disclosed in my copending application Ser. No. 497,999, filed September 2, 1921. At each end of the shafts 15 I provide pitch-line guides adapted to be engaged by the rollers 26 carried on the stub ends of the shafts.

The provision of the widely spaced-apart gear rings 17, 22, each engaged by a pinion fixed to the shaft 15, eliminates any twisting strains to which the pinion 21 would otherwise be subjected due to the relative movement between the parts. The extent of separation is immaterial except that it should be a substantial distance.

In operation, power being applied to the drive shaft, the drive pinion transmits rotary movement and revolution to the shafts 15, a reduction of approximately 2 to 1 being secured. A like motion is imparted to the pinions 16, 21. The pinion 21 revolves around and engages the teeth of the internal gear rings 22, 24, having a different number of teeth. This has the effect of causing relative angular movement of the gear rings and as the ring 24 is held stationary the ring 22 will rotate. The extent of rotation depends on the ratio of the number of teeth in one ring to the number in the other.

A device constructed in accordance with this specification will effect a speed reduction of 215 to 1 and the device is particularly applicable for high speed work. In practice I employ a drive shaft operating speed of 3600 R. P. M.

By providing an intermediate speed reducing device, I am able to secure the same result as though I had reduced the diameter of the drive pinion and increased the diameter of the planetary pinions. However, to do this would increase the size of the hoist and unnecessarily burden the teeth of the small drive pinion.

Obviously the device is capable of considerable modification, and I do not wish to be limited except as indicated in the appended claims.

I claim:

1. In a speed reducing mechanism, the combination of a casing, a drive shaft having a pinion, a pair of internal gear rings of the same pitch diameter and of a different number of teeth, shafts mounted for planetary movement about said drive shaft, pinions on said shafts, each pinion engaging said gear rings whereby to effect relative movement thereof, and a gear of larger diameter than said last named pinions, said gears being fixed to said planetary shafts and engaging said drive pinion whereby to reduce the speed of said planetary shafts.

2. In a hoist, the combination of a drum having a pair of internal gear rings fixed thereto, a stationary gear ring, said last named gear ring being of the same pitch diameter but having a different number of teeth from said first mentioned gear rings. a drive shaft having a pinion thereon, planetary shafts adapted for revolution about said drive shaft, said planetary shafts having secured thereto a short pinion engaging one of said gear rings and a long pinion engaging two other of said gear rings, and gears of larger diameter than said pinions, said gears being also secured to said planetary shafts and engaging said drive pinion.

Signed at Chicago, Illinois, this 25th day of September, 1922.

EARL E. McCOLLUM.